Jan. 4, 1944. J. E. WESTENBERG 2,338,272
TREATMENT OF HYDROCARBONS
Filed March 18, 1940
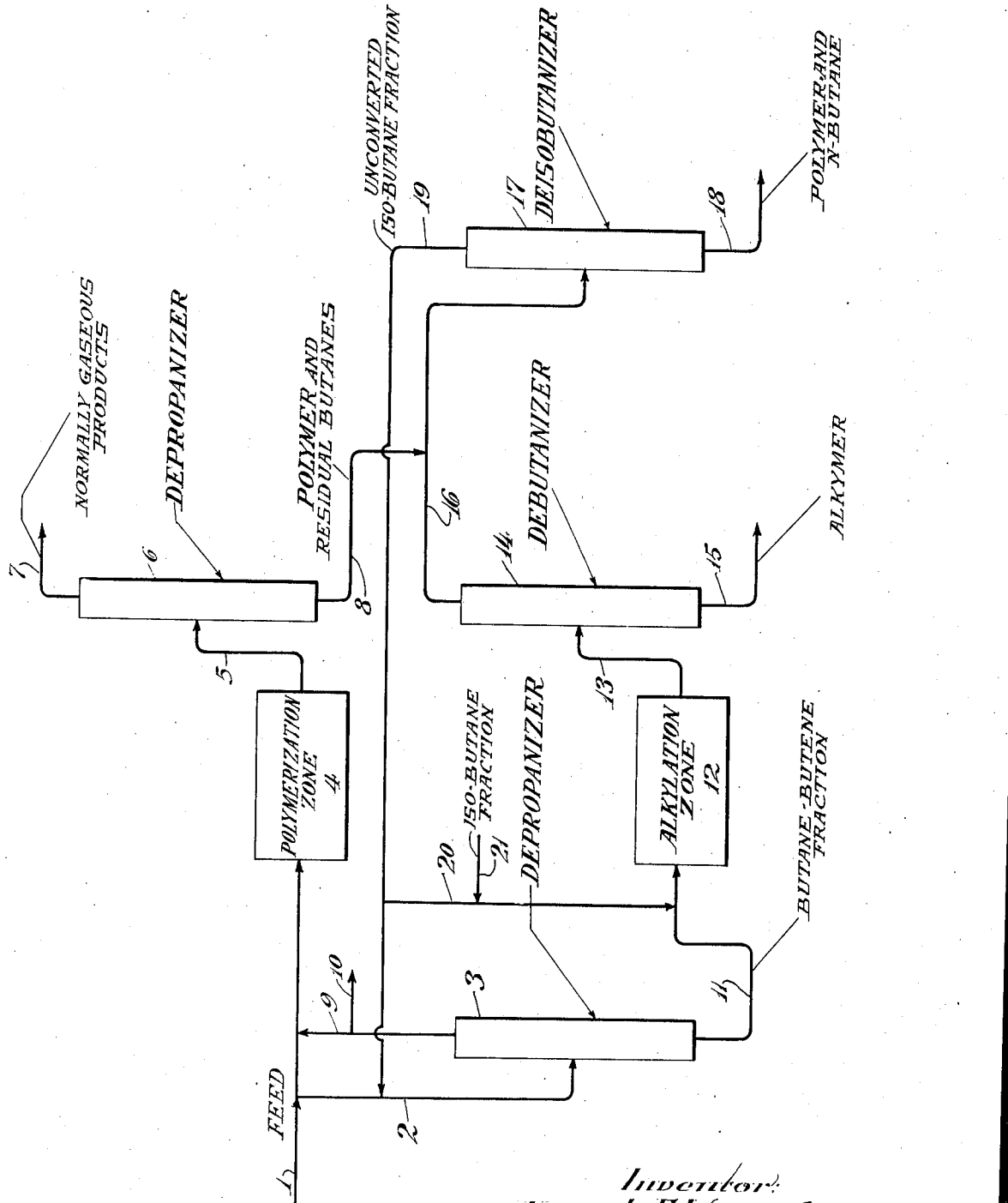

Patented Jan. 4, 1944

2,338,272

UNITED STATES PATENT OFFICE 2,338,272

TREATMENT OF HYDROCARBONS

Joseph E. Westenberg, Chicago, Ill., assignor to Universal Oil Products Company, Chicago, Ill., a corporation of Delaware Application March 18, 1940, Serial No. 324,512

8 Claims. (Cl. 260—683.1)

This invention relates to a new and useful process for utilizing substantially all of the olefinic gaseous hydrocarbons present in a gaseous mixture by producing optimum quantities of both liquid polymers and alkymers therefrom. More specifically the invention is concerned with a combination of polymerization and alkylation steps wherein substantially all of the readily utilizable olefins and iso-butane are utilized in the production of polymer and alkymer, the former useful as a motor fuel blending agent because of its relatively high octane blending value and the latter useful as an aviation gasoline because of its high octane rating and its relatively high degree of paraffinicity.

In the preferred embodiment the invention comprises dividing a gaseous hydrocarbon feed into two fractions, substantially depropanizing one of said fractions to separate a butane-butene fraction from the lighter gases, commingling said lighted gases with the other of said fractions and subjecting the resulting mixture to polymerization treatment whereby to polymerize substantially all of the olefins contained therein, substantially depropanizing the products from said polymerization treatment to separate normally gaseous products from the polymer and residual butanes, recovering said normally gaseous products, subjecting the polymer and residual butanes to treatment as hereinafter set forth, subjecting said butane-butene fraction to alkylation treatment, together with the unconverted iso-butane separated as hereinafter set forth, substantially debutanizing the products from said alkylation treatment to separate butanes from the alkymer and recovering the latter, commingling said butanes with the polymer and residual butanes from the polymerization treatment and substantially separating iso-butane from the polymer and normal butane, recovering said polymer and normal butane, and returning said iso-butane to said alkylation treatment.

The quantity of alkymer which can be produced by the alkylation of iso-butane with butenes found in the ordinary refinery gas, such as stabilizer gas, in most cases will be limited to that quantity which will be produced from the available iso-butane. In most cases, the molal concentration of butenes will exceed the molal concentration of iso-butane and therefore in order to utilize substantially all of the available butenes, iso-butane must be introduced to the system from an outside source or, when iso-butane is not available, polymerization of the butenes is another method for converting them into more valuable products. Since propylene is also present in most refinery gases, the propylene may be polymerized along with the butenes to yield a valuable liquid product.

In order to utilize to the best advantage all of the valuable olefins in a gaseous feed, the invention proposes to separate the gaseous feed into two fractions, one of which contains butenes in an amount which may be advantageously utilized in an alkylation step to which substantially all of the iso-butane introduced to the system is supplied. The other fraction of the gaseous feed is commingled with the C3 and lighter gases separated from the first mentioned fraction and this mixture subjected to polymerization under conditions regulated to effect substantially complete polymerization of the olefins contained in the mixture. With this process it is possible to utilize substantially all of the iso-butane, butenes, and propylene present in the gaseous feed, while only the propane and lighter gases and normal butane are withdrawn from the system to be utilized in some other manner. With this process optimum quantities of alkymer and general polymer are produced from any gaseous feed.

The accompanying drawing illustrates the process steps of the invention in the form of a flow diagram. The polymerization and alkylation zones are both illustrated in simple diagrammatic form, but it is to be understood that the conventional polymerization and alkylation apparatus may be employed in each of the steps, respectively.

Referring to the flow diagram, the feed comprising essentially an olefin-containing gas mixture such as that from a stabilizer produced incidental to the conversion of hydrocarbon oils or any other gaseous mixture which contains both olefins and iso-butane is introduced through line 1 and a portion thereof is directed through line 2 into depropanizer 3 while the residual portion is supplied to polymerization zone 4. The portion of the feed supplied to depropanizer 3 preferably contains in addition to other normally gaseous hydrocarbons the quantity of butenes which may advantageously be utilized in the subsequent alkylation treatment. The ratio into which the feed is divided will depend entirely upon the amount of iso-butane available from all sources, i. e., as the amount of iso-butane available increases, the greater portion of the feed may be diverted through line 2 wherefrom a butane-butene fraction is separated and the butenes utilized in the subsequent alkylation treatment by alkylating therewith iso-butane present in the butane-butene fraction and iso-butane recycled in the manner to be described later.

The portion supplied to zone 4 is preferably commingled with propane, propylene, and lighter gases separated in the manner to be described later, and the mixture subjected to polymerization treatment in zone 4. Polymerization in zone 4 may be accomplished in the presence of a phosphoric acid-containing catalyst which consists in general of a mixture of a relatively inert and siliceous carrier such as kieselguhr impregnated with the ortho or pyrophosphoric acid and is preferably precalcined before using. Other catalysts, however, well known in the art, such as, for example, sulfuric acid, may also be employed within the broad scope of the invention. Polymerizing temperatures when employing a phosphoric acid-containing catalyst may range, for example, from 300 to 450° F. while employing a superatmospheric pressure ranging, for example, from 500 to 1500 pounds or more per square inch.

The products of the polymerization treatment in zone 4 are removed therefrom by way of line 5 and supplied to depropanizer 6 wherein normally gaseous products containing propane, unconverted propene, and lighter gases are separated from the polymer and residual butanes. To accomplish the desired separation in depropanizer 6, pressures may be employed ranging, for example, from 150 to 300 pounds or more per square inch while employing a top temperature in the range of 80 to 140° F. Propane, unconverted propylene, and lighter gases are removed as normally gaseous products from depropanizer 6 by way of line 7 and may be recovered as a product of the process or subjected to any desired further treatment. The polymer and residual butanes separated in depropanizer 6 are removed therefrom by way of line 8 and subjected to treatment in commingled state with butanes separated from the products of the alkylation treatment in the manner to be described later.

A portion of the feed diverted through line 2 and supplied to depropanizer 3, when desired, may be commingled with a portion or all of the unconverted iso-butane fraction separated in the manner to be described later, and the mixture supplied to depropanizer 3. When gases containing less than 4-carbon atoms to the molecule are present in the feed to the alkylation treatment, in order to avoid an increase in the concentration of such gases it is particularly desirable to return at least a portion of the unconverted iso-butane fraction to depropanizer 3 for, in such case, this fraction will contain the gases having less than 4-carbon atoms to the molecule. In any case, the mixture supplied to depropanizer 3 is subjected to fractionation therein to separate propane, propylene, and lighter gases from the butanes and butenes. To accomplish the desired separation in depropanizer 3 a superatmospheric pressure in the range of 150 to 300 pounds or more per square inch and a top temperature ranging from 80 to 140° F. may be employed. Propane, propylene, and lighter gases separated in depropanizer 3 are removed therefrom by way of line 9 and may be recovered as a product of the process by way of line 10, but preferably are commingled with the other portion of the feed in line 1, and supplied in commingled state therewith to polymerization zone 4 for treatment in the manner described.

The butane-butene fraction separated in depropanizer 3 is removed therefrom by way of line 11 and supplied to alkylation zone 12. When desired all or a portion of the above mentioned unconverted iso-butane fraction or an iso-butane fraction introduced from an outside source or both may be supplied to line 11 in the manner to be described later and commingled therein with the butane-butene fraction and this mixture supplied to alkylation zone 12. When all of the unconverted iso-butane fraction is supplied to depropanizer 3 in the above described manner, the iso-butane contained therein will be present in the butane-butene fraction removed from depropanizer 3 by way of line 11. However, when only a portion or none of the unconverted iso-butane fraction is introduced to depropanizer 3, this portion may be commingled with the unconverted iso-butane fraction in line 11 as above described.

The alkylation of the iso-butane with butenes conducted in zone 12 is preferably accomplished in the presence of an excess of iso-butane, the ratio of iso-butane to butenes in the composite feed supplied thereto preferably being on the order of 2:1 to 10:1 when using sulfuric acid as the alkylating catalyst. The temperatures employed in zone 12 using sulfuric acid may range, for example, from 10 to 100° F. with a superatmospheric pressure sufficient to maintain the reactants in substantially the liquid phase. The invention, however, is not limited to the use of sulfuric acid as the alkylating catalyst but may employ other catalysts well known in the art, such as, for example, a phosphoric acid-containing catalyst, using somewhat higher temperatures and pressures.

Products of the alkylation treatment in zone 12 are removed therefrom by way of line 13 and supplied to debutanizer 14 wherein the butanes and unconverted butenes are substantially separated from the alkymer product. To accomplish this separation, debutanizer 14 may be operated at a superatmospheric pressure ranging, for example, from 30 to 200 pounds per square inch with a top temperature in the range of 80 to 200° F. The alkymer separated in debutanizer 14 is removed therefrom by way of line 15 and may be recovered as a product of the process or subjected to any desired further treatment.

The butanes and unconverted butenes separated in debutanizer 14 are removed therefrom by way of line 16 and are commingled with the polymer and residual butanes removed from depropanizer 6 by way of line 8 and this mixture supplied to deisobutanizer 17 wherein the unconverted iso-butane fraction is substantially separated from the polymer and normal butane. When gases containing less than 4-carbon atoms to the molecule are present in the feed to deisobutanizer 17, these gases will be present and the unconverted iso-butane fraction separated therein while only normal butane will be present in the polymer. The polymer and normal butane separated in deisobutanizer 17 are removed therefrom by way of line 18 and may be recovered as a product of the process or subjected to any desired further treatment, such as, for example, stabilization to adjust the composition and vapor pressure of the polymer gasoline.

The unconverted iso-butane fraction separated in deisobutanizer 17 is removed therefrom by way of line 19 and all or a portion introduced to line 2 in the manner previously described. On the other hand, all or the residual portion not introduced to line 2 may be directed through line 20 and commingled with the butane-butene fraction in line 11 in the manner previously described.

When additional iso-butane is available, this may be introduced by way of line 21 into line 20 by means of which it may be introduced either alone or in commingled state with the portion of unconverted iso-butane fraction directed through line 20 into line 11, commingling therein with the butane-butene fraction in the manner previously described.

The process above described is particularly advantageous when it is desirable to produce both motor and aviation gasolines and, in addition, it provides for the substantially complete utilization of the olefins and particularly the C₃ and C₄ olefins in addition to iso-butane. The invention is not limited to any specific catalyst or to the apparatus for accomplishing any of the various reactions, but is more particularly concerned with the cooperative relationship between the various steps.

An example of one specific operation of the process above described is approximately as follows: The charging stock comprising essentially a mixture of normally gaseous hydrocarbons of the following composition:

|  | Mol per cent |
|---|---|
| Methane | 0.6 |
| Ethane | 12.1 |
| Propylene | 13.0 |
| Propane | 18.8 |
| Butenes | 24.3 |
| Iso-butane | 5.2 |
| Normal butane | 26.0 | is divided into two portions, one portion being approximately three times the volume of the other. The smaller of the two portions is supplied to a depropanizer operated at a superatmospheric pressure of approximately 250 pounds per square inch and a top temperature of 100° F. wherein the hydrocarbons containing 3-carbon atoms and less to the molecule are substantially separated from the butane-butene fraction. The fraction containing 3-carbon atoms and less to the molecule is commingled with the larger portion of the feed and the mixture subjected to polymerization in the presence of a phosphoric acid-containing catalyst at a temperature of 400° F. and under a superatmospheric pressure of approximately 300 pounds per square inch. The products from the polymerization treatment are introduced to a depropanizer operated at a superatmospheric pressure of 250 pounds per square inch and at a top temperature of 100° F. wherein normally gaseous products containing 3-carbon atoms and less to the molecule are separated from the normally liquid polymers and residual butanes and the normally gaseous products recovered, while the normally liquid polymers and residual butanes are subjected to treatment in the manner to be described later.

The butane-butene fraction separated in the manner previously described is commingled with an unconverted iso-butane fraction separated in the manner to be described later and the mixture subjected to alkylation treatment using sulfuric acid as the alkylating catalyst at a temperature of 37° F. and under a superatmospheric pressure of 115 pounds per square inch. The products of the alkylation treatment are supplied to a debutanizer operated at a superatmospheric pressure of 70 pounds per square inch and at a top temperature of 125° F. wherein substantially all of the butanes are separated from the alkymer product and the latter recover. The butanes separated in this manner are commingled with the normally liquid polymers and residual butanes separated in the above described manner and the mixture supplied to a deisobutanizer operated at a superatmospheric pressure of 85 pounds per square inch and at a top temperature of 145° F. wherein the unconverted iso-butane fraction is substantially separated from the normally liquid polymers and normal butane, the normally liquid polymers and normal butane being recovered in this step.

The unconverted iso-butane fraction separated in the above described manner is returned in part to the alkylation treatment as previously described and a portion thereof commingled with the smaller portion of the feed subjected to depropanization in order to remove hydrocarbons containing 3-carbon atoms and less to the molecule from the iso-butane to prevent such hydrocarbons building up in the system.

When operating the process of the invention in the above described manner, a yield of approximately 12 weight per cent alkymer and 31.7 weight per cent polymer may be obtained, the balance being residual unconverted normally gaseous hydrocarbons. The polymer produced in this manner will have an octane rating of approximately 83 (motor method) while the alkymer will have an octane rating of approximately 90 (motor method).

I claim as my invention:

1. A process for the production of polymer and alkymer gasolines from a mixture of normally gaseous hydrocarbons, which comprises dividing the said mixture into two portions, depropanizing one portion to separate C₃ and lighter gases from a butane-butene fraction, commingling said C₃ and lighter gases with the other portion of the said mixture and subjecting the resulting mixture to polymerization treatment to polymerize olefins contained therein, substantially separating the products of said polymerization treatment into a fraction containing normally gaseous products and a fraction containing normally liquid polymers and residual butanes, recovering the first named fraction, commingling said butane-butene fraction with an iso-butane fraction separated as hereinafter set forth, and subjecting the mixture to alkylation treatment to form an alkymer by alkylation of iso-butane with butenes, substantially separating residual butanes from the alkymer formed in said alkylation treatment and recovering the latter, commingling said residual butanes with the normally liquid polymer and residual butanes from said polymerization treatment and substantially separating an unconverted iso-butane fraction from the mixture, returning said iso-butane fraction to the alkylation treatment and recovering the normally liquid polymers and residual normal butane.

2. A process for the production of polymer and alkymer gasolines from a mixture of normally gaseous hydrocarbons, which comprises dividing said mixture into two portions, subjecting one portion to polymerization treatment to polymerize olefins contained therein, substantially separating the products of said polymerization treatment into a fraction containing normally gaseous products and a fraction containing normally liquid polymers and residual butanes, recovering the first named fraction, commingling the other portion of said mixture with a portion of an unconverted iso-butane fraction separated as hereinafter set forth and depropanizing the mixture to substantially separate C₃ and lighter hydrocarbons from the butane-butene fraction, recovering said C₃ and lighter hydrocarbons, commingling said butane-butene fraction with the residual portion of said unconverted iso-butane fraction and subjecting the mixture to alkylation treatment to form an alkymer by alkylation of iso-butane with butenes, substantially separating residual butanes from the alkymer formed in said alkylation treatment and recovering the latter, commingling said residual butanes with the normally liquid polymer and residual butanes from said polymerization treatment and substantially separating an unconverted iso-butane fraction from the mixture, commingling a portion of said unconverted isobutane fraction with the portion of the feed mixture which is depropanized and the residual portion thereof with the depropanized butane-butene fraction as hereinbefore set forth, and recovering the normally liquid polymers and residual normal butane.

3. The process defined in claim 2 further characterized by the step which comprises commingling the C₃ and lighter hydrocarbons separated from the second named portion of the feed mixture with the first named portion and subjecting the resulting mixture to the polymerization treatment.

4. The process defined in claim 2 further characterized by the step which comprises commingling iso-butane introduced from an exterior source with the portion of the unconverted isobutane fraction commingled with the butane-butene fraction prior to the alkylation treatment.

5. A process for producing more valuble products from a hydrocarbon gas containing propene, butenes and butanes which comprises dividing said gas into two portions, depropanizing one of said portions to separate a butane-butene fraction from C₃ hydrocarbons, combining the latter with the other portion of said gas and subjecting the resultant mixture to polymerization, separating from the polymerization products a fraction containing normally liquid polymers and butanes, introducing said butane-butene fraction to an alkylation zone and therein alkylating isobutane with butenes, separating normally liquid alkylation products from residual C₄ hydrocarbons, combining the latter with said fraction containing normally liquid polymers and butanes, fractionating the resultant mixture to separate an isobutane fraction therefrom, and supplying said isobutane fraction to the alkylation zone.

6. The process as defined in claim 5 further characterized in that at least a portion of said isobutane fraction is supplied to the alkylation zone by being introduced to the depropanizing step wherein it commingles with said butane-butene fraction.

7. The process as defined in claim 1 further characterized in that at least a portion of said isobutane fraction is supplied to the alkylation treatment by being introduced to the depropanizing step wherein it commingles with said butane-butene fraction.

8. A process for producing more valuable products from a hydrocarbon gas containing propene, butenes and isobutane, which comprises dividing said gas into two portions, one of which contains a sufficient quantity of butenes to alkylate substantially the total isobutane content of the gas, depropanizing the last named portion to separate a butane-butene fraction from C₃ hydrocarbons, combining the latter with the other portion of said gas and subjecting the mixture to polymerization, separating isobutane from the resultant polymerization products, introducing isobutane thus separated and said butane-butene fraction to an alkylation zone and therein alkylating isobutane with butenes.

JOSEPH E. WESTENBERG.

DISCLAIMER 2,338,272.—*Joseph E. Westenberg*. Chicago, Ill. TREATMENT OF HYDROCARBONS.
Patent dated Jan. 4, 1944. Disclaimer filed Apr. 5, 1945, by the assignee, *Universal Oil Products Company*.

Hereby enters this disclaimer to claim 5 of said patent.

[*Official Gazette May 1, 1945.*]